United States Patent
Minami

(10) Patent No.: US 11,399,108 B2
(45) Date of Patent: Jul. 26, 2022

(54) IMAGE READING APPARATUS CAPABLE OF DETERMINING WHETHER MISSING PART OF DOCUMENT IMAGE OCCURS BASED ON EDGE SHAPE OF AT LEAST ONE OF LEADING AND TRAILING EDGES OF DOCUMENT IMAGE

(71) Applicant: KYOCERA Document Solutions Inc., Osaka (JP)

(72) Inventor: Takahiro Minami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/321,322

(22) Filed: May 14, 2021

(65) Prior Publication Data

US 2021/0368054 A1    Nov. 25, 2021

(30) Foreign Application Priority Data

May 21, 2020  (JP) .............................. JP2020-088615
May 21, 2020  (JP) .............................. JP2020-088616
May 21, 2020  (JP) .............................. JP2020-088617
May 21, 2020  (JP) .............................. JP2020-088618
May 21, 2020  (JP) .............................. JP2020-088619

(51) Int. Cl.
*H04N 1/00*    (2006.01)

(52) U.S. Cl.
CPC ..... *H04N 1/00801* (2013.01); *H04N 1/00692* (2013.01); *H04N 1/00748* (2013.01); *H04N 2201/0081* (2013.01)

(58) Field of Classification Search
CPC ............. H04N 1/00718; H04N 1/3878; H04N 1/00681; H04N 1/00748; H04N 1/00737; H04N 2201/0081; H04N 1/00588; H04N 1/00734; H04N 2201/0094; H04N 1/12; H04N 1/0071; H04N 1/00705; H04N 1/00785; H04N 1/409; H04N 1/00591;

(Continued)

(56) References Cited

U.S. PATENT DOCUMENTS 10,757,281 B1 *  8/2020  Wada ................. H04N 1/00748
11,316,996 B2 *  4/2022  Yamada ............. H04N 1/00803

(Continued)

FOREIGN PATENT DOCUMENTS

JP    2010-204906 A    9/2010
JP    2016-086217 A    5/2016

*Primary Examiner* — Negussie Worku
(74) *Attorney, Agent, or Firm* — IP Business Solutions, LLC

(57) ABSTRACT

An image reading apparatus includes an image reading device and a control device. The image reading device performs image reading of an original document to generate a read image. The control device includes a processor and functions, through the processor operating in accordance with a control program, as an edge shape detector and a missing part determiner. The edge shape detector uses as a target image the read image or an image obtained by subjecting the read image to predetermined image processing and detects an edge shape of at least one of a leading edge and a trailing edge of a document image corresponding to the original document in the target image. The missing part determiner determines, based on the detected edge shape, whether or not a missing part of the document image has occurred.

7 Claims, 8 Drawing Sheets

(58) Field of Classification Search
CPC ........... H04N 1/00687; H04N 1/00702; H04N 1/00721; H04N 1/3876; H04N 1/00745; H04N 1/00774; H04N 1/121; H04N 1/125; H04N 1/38; H04N 1/3873; B65H 2801/39
USPC ........................................................ 358/474
See application file for complete search history.

(56) References Cited

U.S. PATENT DOCUMENTS

| | | | | |
|---|---|---|---|---|
| 2011/0141504 | A1* | 6/2011 | Utsunomiya | H04N 1/3878 358/1.9 |
| 2015/0281487 | A1* | 10/2015 | Motoyama | H04N 1/00822 358/1.13 |
| 2015/0373219 | A1* | 12/2015 | Watanabe | H04N 1/00737 358/488 |
| 2016/0119494 | A1* | 4/2016 | Mori | H04N 1/00705 358/1.12 |
| 2016/0309094 | A1* | 10/2016 | Ishida | H04N 5/2621 |
| 2017/0048410 | A1* | 2/2017 | Noro | H04N 1/40056 |
| 2017/0078506 | A1* | 3/2017 | Yamada | H04N 1/00572 |
| 2018/0048786 | A1* | 2/2018 | Sunada | H04N 1/00779 |
| 2020/0296255 | A1* | 9/2020 | Hashimoto | H04N 1/4097 |
| 2021/0152704 | A1* | 5/2021 | Yoshida | H04N 1/00689 |
| 2021/0195036 | A1* | 6/2021 | Kitano | H04N 1/00092 |
| 2021/0385346 | A1* | 12/2021 | Esumi | H04N 1/00708 |
| 2021/0409564 | A1* | 12/2021 | Tomii | H04N 1/00713 |
| 2022/0070322 | A1* | 3/2022 | Ogawa | H04N 1/3878 |

* cited by examiner

IMAGE READING APPARATUS CAPABLE OF DETERMINING WHETHER MISSING PART OF DOCUMENT IMAGE OCCURS BASED ON EDGE SHAPE OF AT LEAST ONE OF LEADING AND TRAILING EDGES OF DOCUMENT IMAGE

INCORPORATION BY REFERENCE

This application claims priority to Japanese Patent Application Nos. 2020-088615, 2020-088616, 2020-088617, 2020-088618, and 2020-088619 filed on 21 May 2020, the entire contents of which are incorporated by reference herein.

BACKGROUND

The present disclosure relates to image reading apparatuses.

A first general form reading apparatus extracts all the edges forming the perimeter of a form portion in a read image to identify the outline of the form portion and determines, based on the identified outline, whether or not the form becomes folded.

A second general image reading apparatus identifies a slope variance for a plurality of edge points on an edge of a sheet and determines the linearity of the plurality of edge points based on the identified slope variance. The above image reading apparatus determines as a slope a value obtained by dividing the vertical distance between two edge points by the horizontal distance between them and identifies a slope variance using the least square method.

SUMMARY

A technique improved over the aforementioned techniques is proposed as one aspect of the present disclosure.

An image reading apparatus according to an aspect of the present disclosure includes an image reading device and a control device. The image reading device performs image reading of an original document to generate a read image. The control device includes a processor and functions, through the processor operating in accordance with a control program, as an edge shape detector and a missing part determiner. The edge shape detector uses as a target image the read image or an image obtained by subjecting the read image to predetermined image processing and detects an edge shape of at least one of a leading edge and a trailing edge of a document image corresponding to the original document in the target image. The missing part determiner determines, based on the detected edge shape, whether or not a missing part of the document image has occurred.

DETAILED DESCRIPTION

Hereinafter, a description will be given of embodiments of the present disclosure with reference to the drawings.

First Embodiment

Figure 1:
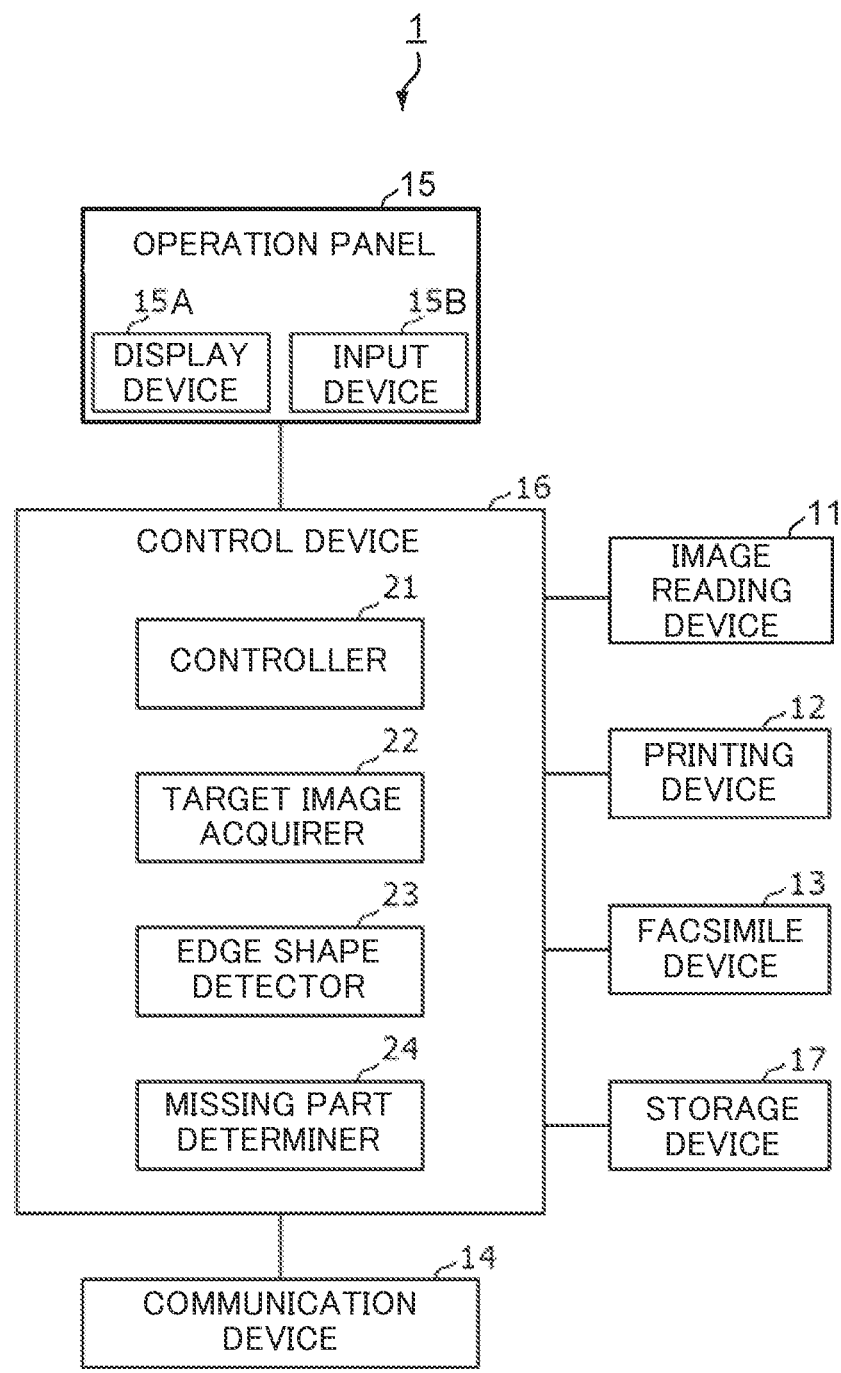
FIG. 1 is a block diagram showing the configuration of an image reading apparatus according to an embodiment of the present disclosure.

FIG. 1 is a block diagram showing the configuration of an image reading apparatus 1 according to an embodiment of the present disclosure. The image reading apparatus 1 shown in FIG. 1 is a multifunction peripheral, a copier, a scanner or the like having an image reading function. The image reading apparatus 1 includes an image reading device 11, a printing device 12, a facsimile device 13, a communication device 14, an operation panel 15, a control device 16, a storage device 17, and so on.

The image reading device 11 is an internal device that optically reads a document image from an original document placed on a platen glass or an original document fed by an automatic document feeder and generates image data on the document image.

The printing device 12 is an internal device that prints the document image and so on. The facsimile device 13 is an internal device that performs conversion of image data generated by the image reading device 11 or other data to a facsimile signal and sending of the facsimile signal, and performs receipt of a facsimile signal and generation of image data from the received facsimile signal. The communication device 14 is a network interface or the like and is an internal device that performs data communication with a terminal device or a server.

The operation panel 15 is disposed on the top side of a housing of the image reading apparatus 1. The operation panel 15 is an internal device including: a display device 15A that displays an operation screen toward a user; and an input device 15B that accepts a user's operation. The display device 15A is a liquid crystal display or the like. The input device 15B is hard keys, a touch panel implementing soft keys together with the display device 15A or other types of input devices.

The control device 16 includes a computer including a CPU (central processing unit), a ROM (read only memory), a RAM (random access memory), and so on, and an ASIC (application specific integrated circuit). The control device 16 functions as various processors. Specifically, the control device 16 loads programs stored in the ROM or the storage device 17 onto the RAM, executes the programs on the CPU, and thus operates as various processors by software or operates as various processors by hardware in the ASIC or the like. The storage device 17 is a non-volatile storage device, such as a flash memory. The storage device 17 stores data and programs.

In this embodiment, the control device 16 functions as a controller 21, a target image acquirer 22, an edge shape detector 23, and a missing part determiner 24.

The controller 21 accepts a job request based on a user's operation on the operation panel 15 and a job request (a request for a scan job, a copy job, a facsimile transmission job or the like) sent from a host apparatus or the like by the communication device 14 and uses an associated one of the internal devices to execute the job specified by the job request.

Furthermore, in executing a job accompanied by image reading of an original document, such as a scan job, a copy job or a facsimile transmission job, the controller 21 acquires image data on the read image from the image reading device 11, saves the image data in the RAM or the storage device 17, and uses the target image acquirer 22, the edge shape detector 23, and the missing part determiner 24 to determine whether or not a missing part of the document image due to a fold or a lost part of the original document has occurred. If a missing part of the document image has occurred, the controller 21 allows the display device 15A to display a message notifying the user of the occurrence of a missing part. When a page where a missing part of a document image has occurred is detected while an automatic document feeder continuously performs image reading of a plurality of pages of original documents, the controller 21 may allow the image reading device 11 to stop the image reading of the original documents on the page or may allow the image reading device 11 to continue to perform the image reading of the original documents while allowing the display device 15A to display a message showing that the page is involved in the occurrence of a missing part.

The target image acquirer 22 acquires a target image to be checked for a missing part of a document image. In this embodiment, the target image acquirer 22 acquires as a target image an image obtained by subjecting a read image generated by image reading of an original document by the image reading device 11 to predetermined image processing. The read image is an image generated by the image reading device 11 having read an image of a region of a predetermined size containing an original document.

Specifically, the target image acquirer 22 subjects the read image to size reduction processing (resolution conversion), processing for conversion to a greyscale image, edge enhancement processing, and expansion and contraction processing. When the read image contains luminance data (for example, when the read image is a greyscale image), the target image acquirer 22 omits the processing for conversion to a greyscale image. The target image acquirer 22 performs the edge enhancement processing by subjecting a reduced-size image obtained from the read image by the size reduction processing to processing for binarizing the pixel value of each pixel according to whether or not its luminance difference from a spatially adjacent pixel is greater than a predetermined threshold value, thus generating an edge image. The target image acquirer 22 performs the expansion and contraction processing by subjecting the edge image to expansion processing and then to contraction processing, thus reducing improper discontinuity of the edges. In this case, the target image acquirer 22 acquires as a target image a binary image obtained by subjecting the edge image to the expansion and contraction processing.

Alternatively, the target image acquirer 22 may not subject the read image obtained by image reading of the original document to the predetermined image processing, but may acquire the read image as a target image as it is.

The edge shape detector 23 detects the edge shape of at least one (i.e., the edge extending along the main scanning direction) of the leading edge and the trailing edge of the document image in the target image.

Figure 2:
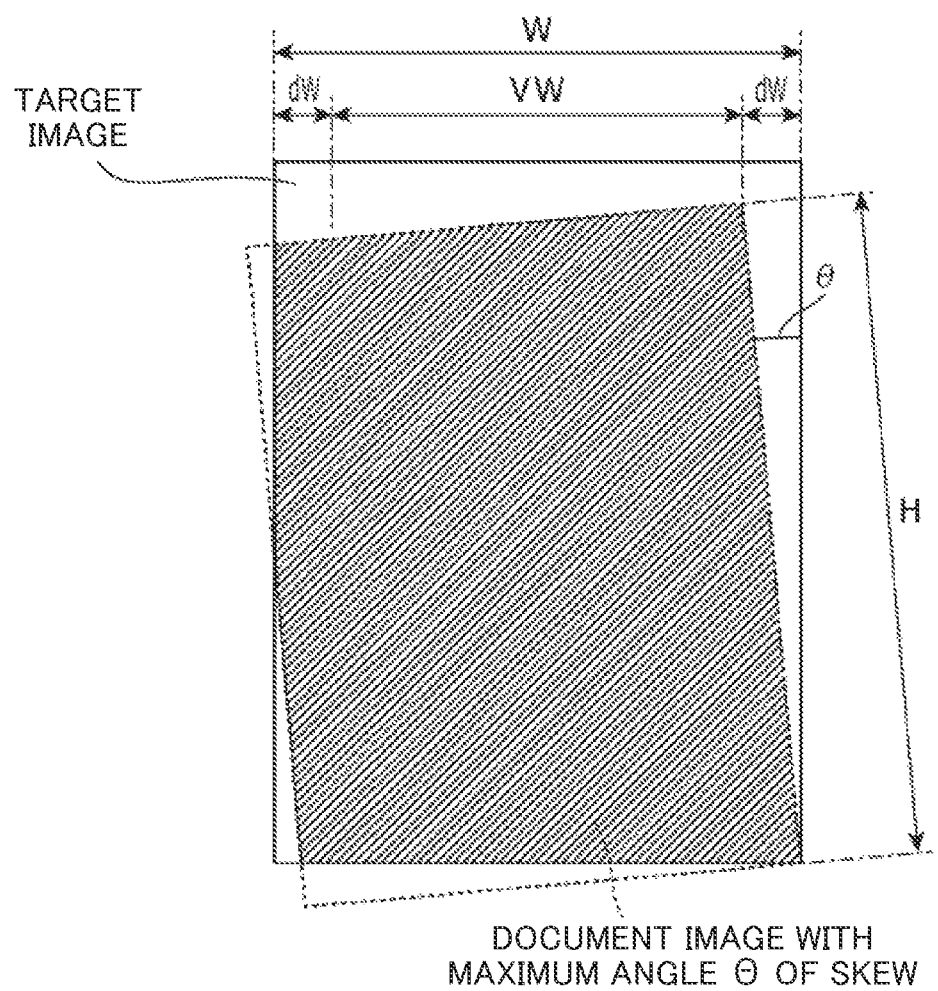
FIG. 2 is a view for illustrating a non-end section.
Figure 3:
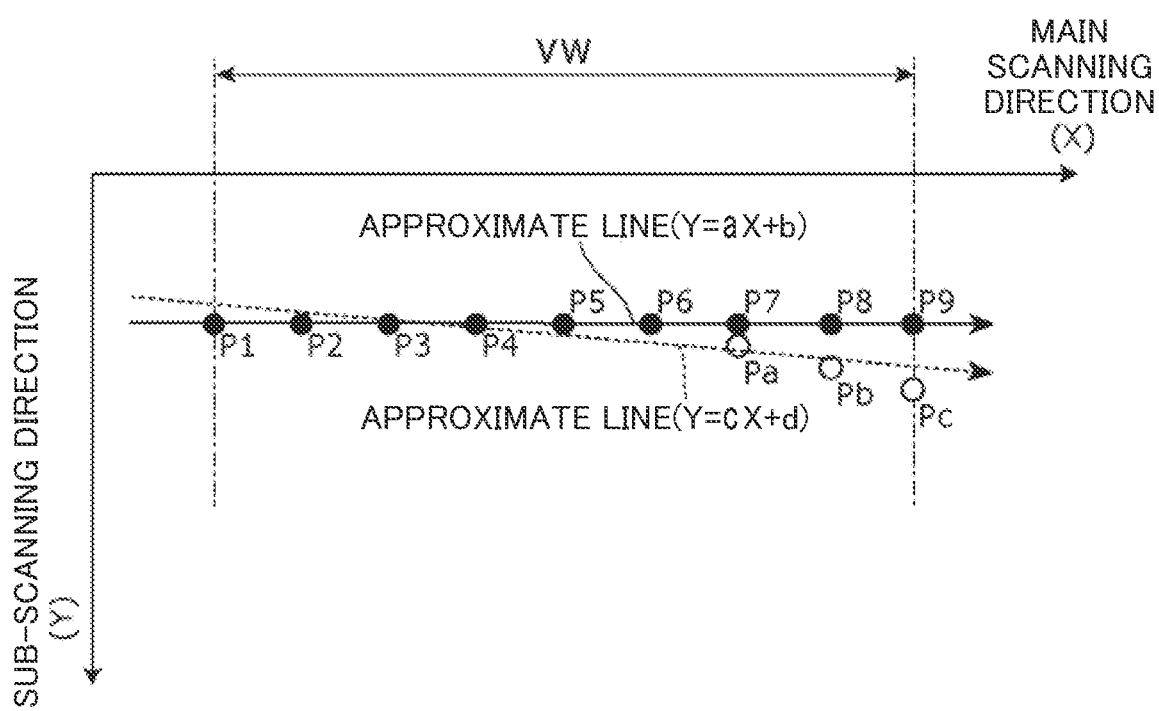
FIG. 3 is a view for illustrating an approximate line corresponding to an edge in the non-end section.

FIG. 2 is a view for illustrating a non-end section of the target image. FIG. 3 is a view for illustrating an approximate line corresponding to an edge in the non-end section.

The edge shape detector 23 detects, for example, as shown in FIG. 2, the edge shape of at least one of the leading edge and the trailing edge of the document image in the target image, in a non-end section VW where both lateral end portions of a predetermined width dW in the target image are excluded from the total width W of the target image (the width thereof in the main scanning direction(X)). Specifically, the edge shape detector 23 identifies an approximate line corresponding to an edge in the non-end section VW obtained by excluding both the lateral end portions of a predetermined width dW from the target image and determines whether or not the identified approximate line is obtained with an accuracy rate equal to or higher than a predetermined threshold value. When the identified approximate line is obtained with an accuracy rate equal to or higher than the predetermined threshold value, the edge shape detector 23 does not subject the edge in the non-end section VW to segment shape search processing that will be described hereinafter. When the identified approximate line is not obtained with an accuracy rate equal to or higher than the predetermined threshold value, the edge shape detector 23 subjects the edge in the non-end section VW to the segment shape search processing.

The edge shape detector 23 samples in the non-end section VW a plurality of edge points at predetermined intervals along the main scanning direction and derives an approximate line by the least square method based on the coordinate values of the plurality of edge points (hereinafter, approximate lines to be described later are derived in the same manner).

When the target image acquirer 22 acquires as a target image a binary image obtained by subjecting an edge image to the expansion and contraction processing, the edge shape detector 23 uses as edge points edge pixels having values indicating the locations of edges among the binary values of the binary image, uses, as for the leading edge, edge pixels first detected in the search beginning with the top end of the target image, and uses, as for the trailing edge, edge pixels first detected in the search beginning with the bottom end of the target image.

When the target image acquirer 22 does not binarize a target image and uses as a target image an image having multiple tones, like the read image, the edge shape detector 23 uses as edge points edge pixels each having a luminance difference of the predetermined threshold value or more from an adjacent pixel in the sub-scanning direction(Y), uses, as for the leading edge, edge pixels first detected in the search beginning with the top end of the target image, and uses, as for the trailing edge, edge pixels first detected in the search beginning with the bottom end of the target image.

Furthermore, the edge shape detector 23 sets the above-mentioned predetermined width dW as a constant associated with a predetermined maximum angle θ of skew in skewing of an original document during image reading thereof, according to the following formula.

$$dW = H \times \sin(\theta)$$

In the formula, H represents the height of a document image and is previously specified based on the size of an original document to be subjected to image reading.

Furthermore, the edge shape detector 23 uses, as the above-mentioned accuracy rate, the rate of the number of edge points located within a predetermined range TH (a predetermined range in the sub-scanning direction) from the approximate line to the number of edge points sampled in a specified section (the non-end section VW in this case) (the same applies to the accuracy rates that will be described hereinafter).

In the absence of any missing part in a document image, the edge shape detector 23 samples a large number of linearly located edge points, for example, like edge points P1 to P9 shown in FIG. 3. Therefore, the distances of the edge points from the approximate line are short, or in other words, a large number of edge points are located within the predetermined range TH from the approximate line, so that the accuracy rate is high. On the other hand, in the presence of a missing part in a document image, the edge shape detector 23 samples some edge points not located linearly, for example, like edge points P1 to P6, Pa, Pb, and Pc shown in FIG. 3. Therefore, the number of edge points located at a short distance from the approximate line is smaller than that in the absence of any missing part in the document image, so that the accuracy rate is low.

Figure 4:
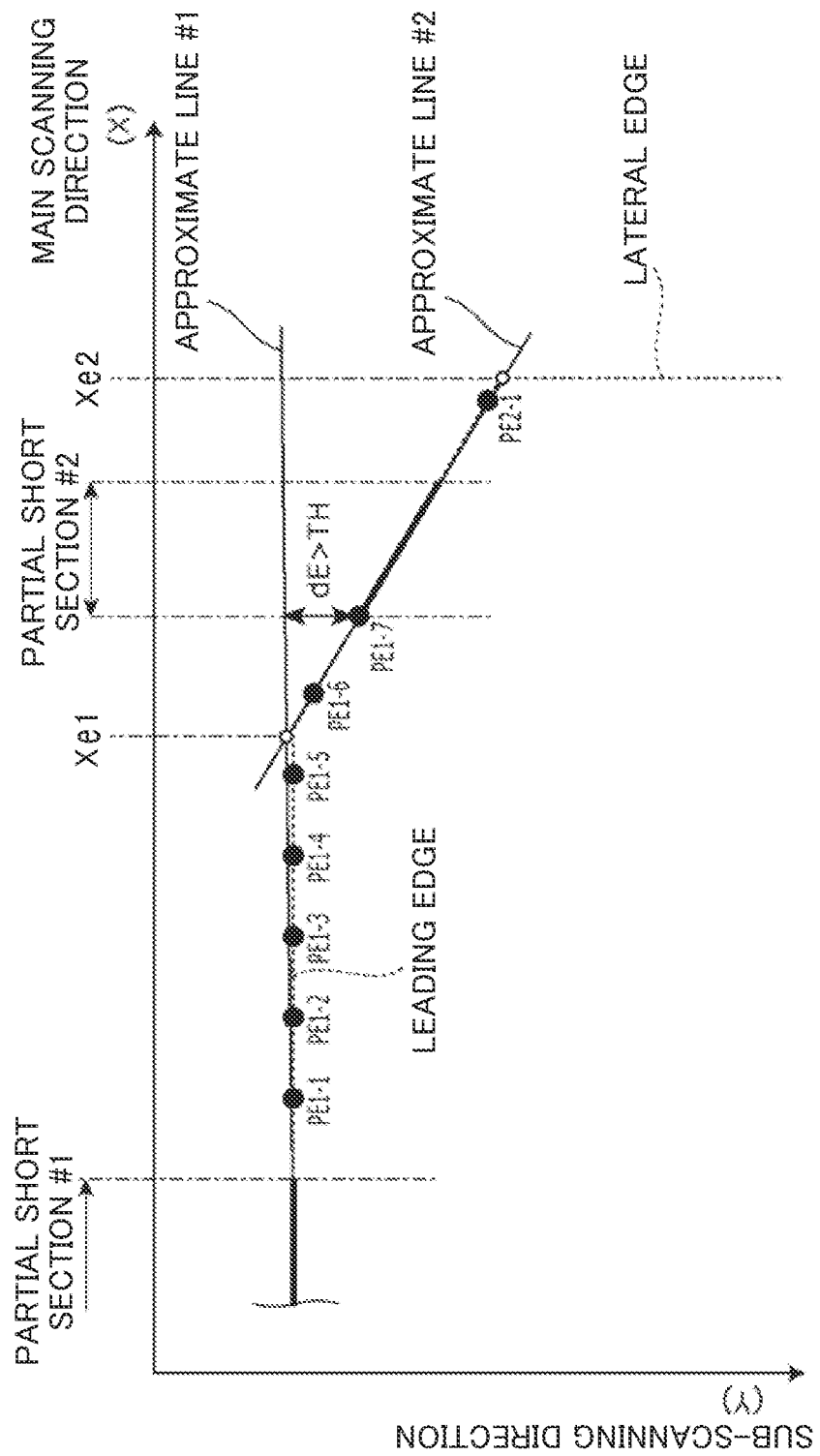
FIG. 4 is a view for illustrating a segment shape associated with a partial short section.

FIG. 4 is a view for illustrating a segment shape associated with a partial short section.

The edge shape detector 23 identifies the edge shape by setting a first partial short section of a target image in a predetermined direction thereof (in the main scanning direction in this case) and then repeatedly executing segment shape search processing for deriving a segment shape associated with each partial short section.

Specifically, in the segment shape search processing, for example, as shown in FIG. 4, the edge shape detector 23 identifies an approximate line #i (an approximate line #1 in this case) corresponding to an edge portion in a partial short section #i (a partial short section #1 in this case) being currently set and determines the identified approximate line #i as a segment shape associated with the partial short section #i. The edge shape detector 23 then sequentially samples and detects edge points PEi-j at predetermined intervals laterally outwardly from the partial short section #i (i.e., from at least one side of the partial short section #i toward an end of the target image in the main scanning direction) and determines whether or not the distance dE from the approximate line #i to each edge point PEi-j is within the predetermined range TH (the predetermined range in the sub-scanning direction). When the distance dE from the approximate line #i to the edge point PEi-j falls out of the predetermined range TH, the edge shape detector 23 sets the next partial short section #(i+1) (a partial short section #2 in this case) based on the location of the edge point Pi-j.

The segment shape obtained as to one partial short section is expressed by a linear equation of an approximate line (or a formula of an approximate line and end point coordinates of the section). The edge shape detector 23 allows the storage device 17 or the ROM of the control device 16 to store edge shape information containing the segment shape.

In the case shown in FIG. 4, when the edge shape detector 23 sequentially samples edge points PEi-j laterally outwardly from one side of the partial short section #1 (the first partial short section) (i.e., in the positive main scanning direction), the distance dE from the approximate line #1 corresponding to the partial short section #1 to the edge point PE1-7 falls out of the predetermined range TH. Therefore, the edge shape detector 23 sets a partial short section #2 of a predetermined width from the location of the edge point PE1-7. The edge shape detector 23 derives an approximate line #2 corresponding to an edge portion in the partial short section #2 and then sequentially samples and detects edge points PE2-j in the same direction. When the sampling point reaches a lateral edge of the document image, so that any edge point is no longer detected, the edge shape detector 23 ends the search for a segment shape (an approximate line) in this direction (in one laterally outward direction). Likewise, the edge shape detector 23 sequentially searches for a segment shape (an approximate line) also laterally outwardly from the other side of the partial short section #1 (the first partial short section) (i.e., in the negative main scanning direction). The edge shape detector 23 allows the edge shape information to contain a plurality of segment shapes (approximate lines) detected by the search in both the directions, for example, as a plurality of segment shapes (approximate lines) forming the edge shape of the leading edge.

The edge shape detector 23 sets the above-mentioned partial short section to a section corresponding to about one-tenth the width of the top side or bottom side of an original document. In this relation, the edge shape detector 23 sets the above-mentioned first partial short section #1 to a section of approximately 2 cm in this embodiment and sets the above-mentioned next partial short section #i (i>1) to a shorter section than the first partial short section, specifically, a section of approximately 1.5 cm in this embodiment.

In setting the above-mentioned first partial short section, the edge shape detector 23 first selects, as a candidate for the first partial short section, a predetermined section in a predetermined direction (the main scanning direction in this case) of a target image and then determines whether or not an approximate line corresponding to an edge portion in the predetermined section is obtained with an accuracy rate equal to or higher than a predetermined threshold value. When an approximate line corresponding to the edge portion in the predetermined section is obtained with an accuracy rate equal to or higher than the predetermined threshold value, the edge shape detector 23 sets the predetermined section as the first partial short section. When an approximate line corresponding to the edge portion in the predetermined section is not obtained with an accuracy rate equal to or higher than the predetermined threshold value, the edge shape detector 23 selects a different section from the predetermined section as a candidate section. Then, when an approximate line corresponding to an edge portion in the different section is obtained with an accuracy rate equal to or higher than the predetermined threshold value, the edge shape detector 23 sets the different section as the first partial short section. The edge shape detector 23 uses as the above accuracy rate the rate of the number of edge points located within a predetermined range (a predetermined range in the sub-scanning direction) from the approximate line to the number of edge points sampled in the predetermined section.

In other words, the edge shape detector 23 searches for a section (a section having the same width as the partial short section) where an approximate line can be obtained with an accuracy rate equal to or higher than the predetermined threshold value. In this embodiment, the edge shape detector 23 first selects as a first section (i.e., the above-mentioned predetermined section) a central section of the target image in the main scanning direction. When an approximate line as described above cannot be obtained in the first section, the edge shape detector 23 selects a section located adjacent to one of the right and left of the first section (a different section as described above). When an approximate line as described above cannot be obtained in the adjacent section, the edge shape detector 23 selects a section located adjacent to the other of the right and left of the first section (another different section as described above).

The predetermined range in the segment shape search processing may be equal to or different from the predetermined range for use in deriving the accuracy rate.

The missing part determiner 24 determines, based on the detected edge shape, whether or not a missing part of the document image has occurred. Specifically, the missing part determiner 24 identifies a missing part area based on the detected edge shape and determines, based on the missing part area, whether or not a missing part of the document image has occurred.

Figure 5:
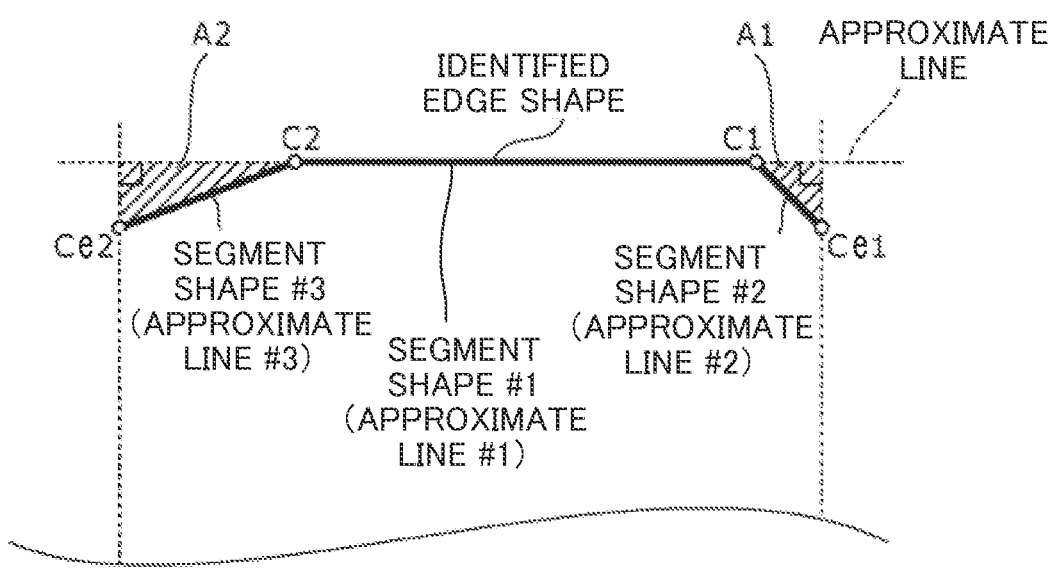
FIG. 5 is a view for illustrating a missing part area.

FIG. 5 is a view for illustrating a missing part area. Specifically, for example, as shown in FIG. 5, the missing part determiner 24 identifies, as the missing part area, the area of one or a plurality of regions defined by an approximate line of an edge portion in a specified partial short section of the target image in a predetermined direction (the approximate line #1 associated with the first partial short section #1 in this case) and the edge identified by the edge shape.

For example, as shown in FIG. 5, when three approximate lines #1, #2, and #3 are detected by the edge shape detector 23, the missing part determiner 24 first derives the respective coordinate values of the intersections C1 and C2 of the approximate line #1 in the first partial short section with the approximate lines #2 and #3 in the adjacent partial short sections. In the case shown in FIG. 5, no approximate line exists on the lateral sides of the approximate lines #2 and #3. However, if any approximate lines exist on the lateral sides of the approximate lines #2 and #3, the missing part determiner 24 sequentially derives the coordinate values of the intersections of the approximate lines. On the other hand, as for the approximate lines #2 and #3 connecting to the lateral edges or the end points of the non-end section, the missing part determiner 24 derives the respective coordinate values of the intersections Ce1 and Ce2 of the approximate lines #2 and #3 of the segment shapes with the lateral edges or the end points of the non-end section. Based on the intersections C1, C2, . . . , Ce1, and Ce2 obtained in the above manners and the approximate line #1, the missing part determiner 24 identifies the shapes of the missing parts (two missing parts in this case) and derives the respective areas A1 and A2 of the two missing parts. The missing part determiner 24 derives as the above-described missing part area the sum of the areas A1 and A2 of the missing parts.

When, with regard to the leading edge or the trailing edge, an approximate line corresponding to an edge in the non-end section VW cannot be obtained with an accuracy rate equal to or higher than the predetermined threshold value, the missing part determiner 24 determines, based on the edge shape detected by the segment shape search processing executed for the edge, whether or not a missing part of the document image has occurred.

When, with regard to both the leading edge and the trailing edge, an approximate line corresponding to an edge in the non-end section VW can be obtained with an accuracy rate equal to or higher than the predetermined threshold value and both the approximate lines of the leading edge and trailing edge are substantially parallel with each other, the missing part determiner 24 determines that no missing part of the document image has occurred. When the approximate line of the leading edge is not substantially parallel with the approximate line of the trailing edge, the missing part determiner 24 determines that a missing part of the document image has occurred.

Figure 6:
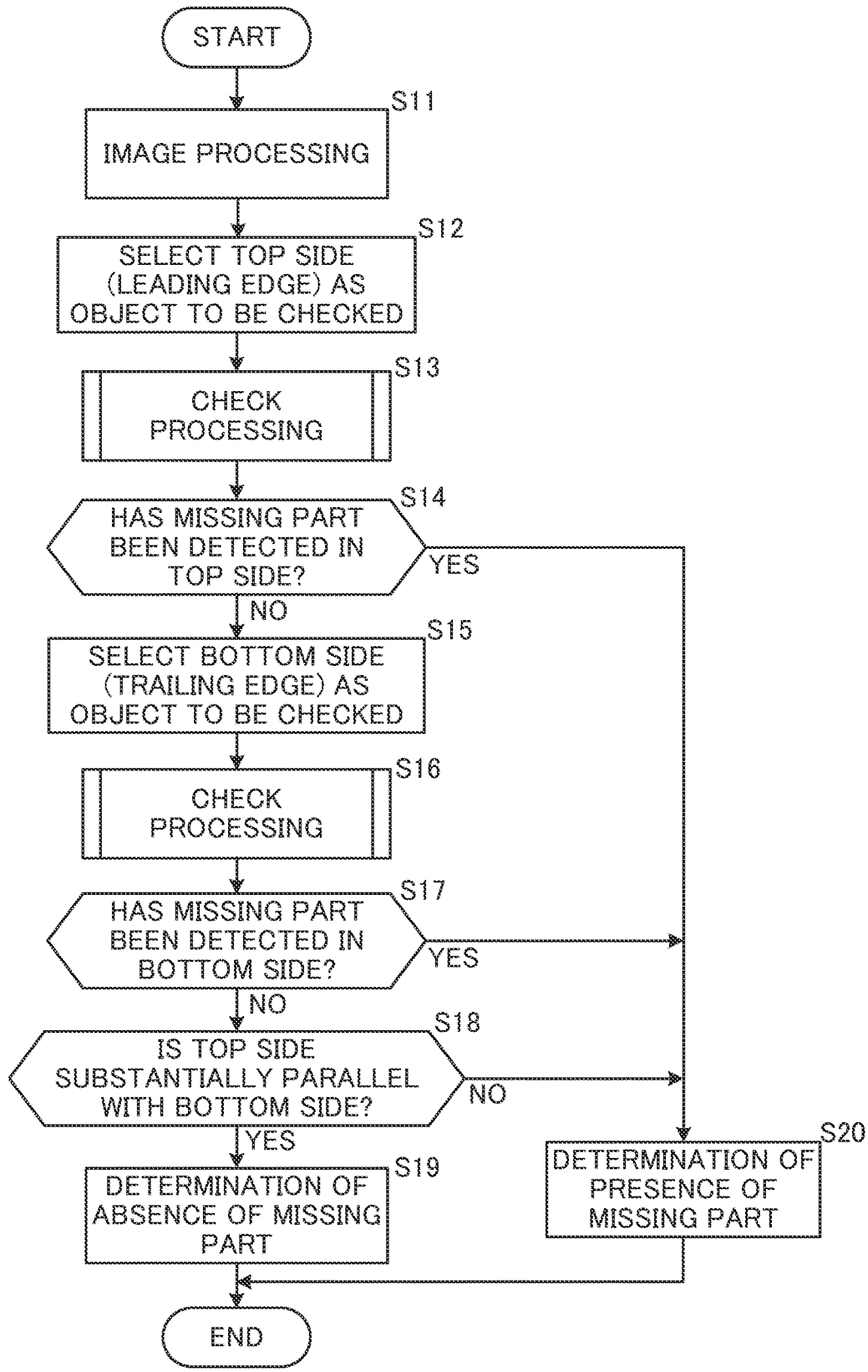
FIG. 6 is a flowchart for explaining an operation of the image reading apparatus according to a first embodiment.
Figure 7:
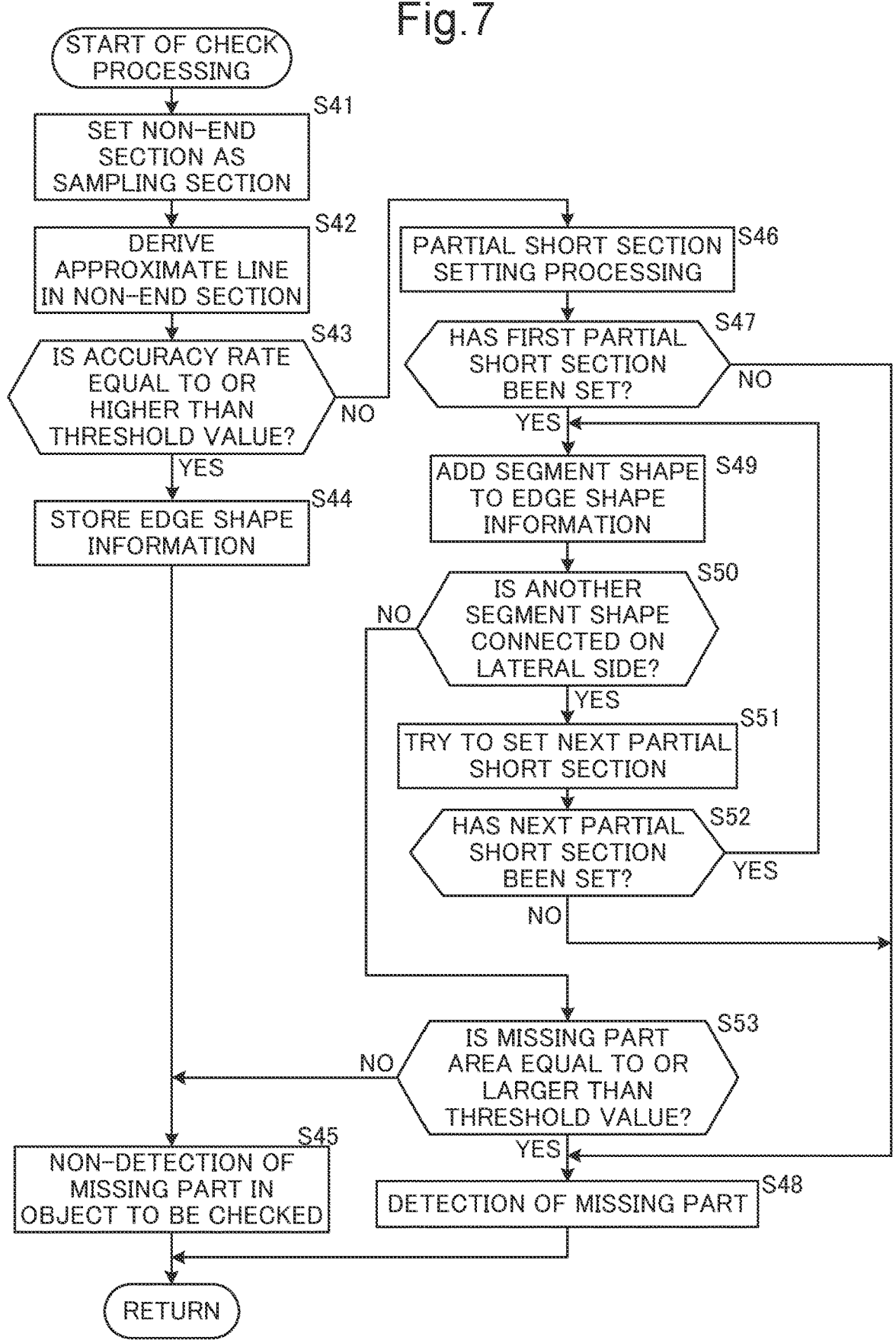
FIG. 7 is a flowchart for explaining check processing (steps S13 and S16) in FIG. 6.

Next, a description will be given of an operation of the image reading apparatus 1 according to the first embodiment. FIG. 6 is a flowchart for explaining the operation of the image reading apparatus 1 according to the first embodiment. FIG. 7 is a flowchart for explaining check processing (steps S13 and S16) in FIG. 6.

When accepting a job request to execute a job accompanied by image reading, the controller 21 first allows the image reading device 11 to perform image reading of an original document, acquires image data on the read image from the image reading device 11, saves the image data, and allows the target image acquirer 22, the edge shape detector 23, and the missing part determiner 24 to execute check processing and so on in the following manners.

The target image acquirer 22 subjects the read image to the predetermined image processing (such as the above-described size reduction processing) to generate a target image (step S11).

The controller 21 selects the top side (the leading edge) of the original document as an object to be checked (step S12) and allows the target image acquirer 22, the edge shape detector 23, and the missing part determiner 24 to execute check processing for the leading edge (step S13).

Based on the check result of the check processing (step S13) for the top side (the leading edge), the controller 21 determines whether or not a missing part of the document image has been detected in relation to the top side (the leading edge) (step S14).

When the controller 21 determines that no missing part of the document image has been detected in relation to the top side (the leading edge) (NO in step S14), the controller 21 selects the bottom side (the trailing edge) of the original document as an object to be checked (step S15) and allows the target image acquirer 22, the edge shape detector 23, and the missing part determiner 24 to execute check processing for the trailing edge (step S16).

Based on the check result of the check processing (step S16) for the bottom side (the trailing edge), the controller 21 determines whether or not a missing part of the document image has been detected in relation to the bottom side (the trailing edge) (step S17).

When the controller 21 determines that no missing part of the document image has been detected in relation to the bottom side (the trailing edge) (NO in step S17), the missing part determiner 24 determines, with reference to the edge shape (the approximate line) of the leading edge and the edge shape (the approximate line) of the trailing edge, whether or not both the edge shapes are substantially parallel with each other (step S18). In doing so, when the angle between both the edge shapes is less than a predetermined threshold value, the missing part determiner 24 determines that both the edge shapes are substantially parallel with each other. When the angle between both the edge shapes is equal to or more than the predetermined threshold value, the missing part determiner 24 determines that both the edge shapes are not substantially parallel with each other.

When the edge shape is identified by a plurality of segment shapes (i.e., a plurality of approximate lines), the missing part determiner 24 uses, for example, an approximate line of the longest of the plurality of segment shapes or an approximate line of the segment shape located in the middle of the target image to derive the difference between the angle of slope of the approximate line of the leading edge and the angle of slope of the approximate line of the trailing edge and determines, based on the difference, whether or not both the edge shapes are substantially parallel with each other.

When the missing part determiner 24 determines that both the edge shapes are substantially parallel with each other (YES in step S18), the controller 21 determines that no missing part of the document image has occurred in the target image (step S19).

On the other hand, when the controller 21 determines that a missing part of the document image has been detected in relation to the top side (the leading edge) or the bottom side (the trailing edge) (YES in step S14 or step S17) or when the missing part determiner 24 determines that the edge shape of the leading edge is not substantially parallel with the edge shape of the trailing edge (NO in step S18), the controller 21 determines that a missing part of the document image has occurred in the target image (step S20).

With reference to FIG. 7, a description will be given below of the check processing in steps S13 and S16.

The edge shape detector 23 sets a non-end section VW as to the edge (the leading edge or the trailing edge) to be checked (step S41) and samples edge points at the predetermined intervals in the non-end section VW. The edge shape detector 23 derives an approximate line based on the coordinate values of the edge points (step S42) and determines whether or not the accuracy rate in the non-end section VW is equal to or higher than the predetermined threshold value (step S43). The edge shape detector 23 sets the above-mentioned predetermined intervals to be wider than the intervals between edge points in the segment shape search processing.

When it is determined that the accuracy rate is equal to or higher than the predetermined threshold value (YES in step S43), the edge shape detector 23 allows the storage device 17 or the RAM to store edge shape information containing the approximate line as one segment shape (step S44), the missing part determiner 24 determines that no missing part of the document image has been detected in relation to the edge to be checked (step S45), and the check processing ends.

On the other hand, when it is determined that the accuracy rate is lower than the predetermined threshold value (NO in step S43), the edge shape detector 23 executes partial short section setting processing to try to set the first partial short section (step S46).

Specifically, in the partial short section setting processing, the edge shape detector 23 sets a candidate section for a partial short section as described previously, samples a plurality of edge points in the set section, and derives an approximate line based on the plurality of edge points. The edge shape detector 23 sets, as the first partial short section, a section where an approximate line can be obtained with an accuracy rate equal to or higher than the predetermined threshold value. On the other hand, if a candidate section is set predetermined number of times and a first partial short section is searched for each time, but a section where an approximate line can be obtained with an accuracy rate equal to or higher than the predetermined threshold value cannot be found, the edge shape detector 23 ends the partial short section setting processing without setting the first partial short section.

The missing part determiner 24 determines whether or not the first partial short section has been set in the partial short section setting processing (step S47). If the first partial short section has not been set (NO in step S47), the missing part determiner 24 determines that a missing part of the document image has been detected in relation to the edge to be checked (step S48) and ends the check processing.

On the other hand, when the first partial short section has been set (YES in step S47), the edge shape detector 23 adds the approximate line associated with the first partial short section (the approximate line identified in association with the first partial short section in the partial short section setting processing (step S46) in this case) as one segment shape to the edge shape information on the edge to be checked (step S49).

Next, the edge shape detector 23 determines whether or not the above segment shape connects to another segment shape (step S50).

Specifically, the edge shape detector 23 samples edge points at predetermined intervals from an end point of the partial short section until any edge point can be no longer sampled or until an edge point (hereinafter, referred to as an out-of-range edge point) the distance of which from the approximate line falls out of a predetermined range TH appears. When an edge point the distance of which from the approximate line falls out of the predetermined range TH appears, the edge shape detector 23 determines that the segment shape connects to another segment shape. When any edge point is no longer sampled without appearance of any edge point the distance of which from the approximate line falls out of the predetermined range TH (i.e., in this case, when all the edge points to an end point of the non-end section are located within the predetermined range from the approximate line), the edge shape detector 23 determines that the segment shape does not connect to any other segment shape.

When determining that the segment shape connects to another segment shape (YES in step S50), the edge shape detector 23 tries to set the next partial short section (a section of a predetermined width from the out-of-range edge point) based on the detected out-of-range edge point (step S51).

Specifically, the edge shape detector 23 selects a section of a predetermined width from the out-of-range edge point as a candidate section for the next partial short section and, in the same manner as in the partial short section setting processing (step S46), derives an approximate line associated with the candidate section and derives the accuracy rate. When the accuracy rate is equal to or higher than the predetermined threshold value, the edge shape detector 23 sets the candidate section as the next partial short section. When the accuracy rate is lower than the predetermined threshold value, the edge shape detector 23 does not set the next partial short section.

The edge shape detector 23 determines whether or not the next partial short section has been set (step S52). When the next partial short section has been set (YES in step S52), the edge shape detector 23 executes the processing in step S49 and the subsequent steps for the set next partial short section. On the other hand, when the next partial short section has not been set (NO in step S52), the missing part determiner 24 determines that a missing part of the document image has been detected in relation to the edge to be checked (step S48), and ends the check processing.

In the above manner, the edge shape detector 23 executes the segment shape search processing until there is no other connecting segment shape and thus identifies the edge shape.

When the edge shape detector 23 determines that the current segment shape does not connect to any other segment shape (NO in step S50), the missing part determiner 24 determines, based on the identified edge shape, whether or not the above-described missing part area is equal to or greater than a predetermined threshold value (step S53). When the missing part area is equal to or greater than the predetermined threshold value (YES in step S53), the missing part determiner 24 determines that a missing part of the document image has been detected (step S48), and ends the check processing. On the other hand, when the missing part area is less than the predetermined threshold value (NO in step S53), the missing part determiner 24 determines that no missing part of the document image has been detected (step S45), and ends the check processing.

The first form reading apparatus described previously extracts all the edges forming the perimeter of a form portion in a read image to identify the outline of the form portion.

Therefore, if the edges are extracted pixel by pixel, the amount of calculation is large, so that the processing time may be long. On the other hand, if the edge locations are discretely extracted, the outline may be erroneously identified, so that any fold may not be able to be correctly detected. Since the second image reading apparatus described previously needs to calculate the slopes for all of a plurality of edge points and their variance, the amount of calculation is large, so that the processing time may be long.

Unlike the above general image reading apparatuses, in the first embodiment, the edge shape detector 23 detects the edge shape of at least one of the leading edge and the trailing edge of a document image in a target image. The missing part determiner 24 determines, based on the detected edge shape, whether or not a missing part of the document image has occurred. The edge shape detector 23 identifies the edge shape by setting a first partial short section of the target image in a predetermined direction thereof and then repeatedly executing the segment shape search processing for deriving a segment shape associated with each partial short section. The edge shape detector 23 identifies, in the segment shape search processing, an approximate line corresponding to an edge portion in the partial short section and determines the identified approximate line as a segment shape associated with the partial short section. The edge shape detector 23 then sequentially detects edge points at predetermined intervals from at least one side of the partial short section toward an end of the target image in the predetermined direction. When the distance from the approximate line to an associated edge point falls out of a predetermined range, the edge shape detector 23 sets the next partial short section in association with the edge point.

Thus, the number of edge points sampled can be relatively small and, therefore, a missing part of a document image can be properly detected with a relatively small amount of calculation.

Furthermore, in the first embodiment, the edge shape detector 23 detects the edge shape of at least one of the leading edge and the trailing edge of a document image in a target image, in a non-end section VW where both lateral end portions of a predetermined width dW in the target image are excluded from the target image. In doing so, the edge shape detector 23 sets the predetermined width dW in association with a predetermined maximum angle θ of skew in skewing of the original document during image reading thereof.

Thus, the number of edge points sampled can be relatively small and it can be prevented that lateral edges are erroneously sampled as edge points due to skewing of the original document during image reading thereof. Therefore, a missing part of a document image can be properly detected with a relatively small amount of calculation.

Furthermore, in the first embodiment, in setting the first partial short section, the edge shape detector 23 selects, as a candidate for the first partial short section, a predetermined section in a predetermined direction of a target image and then determines whether or not an approximate line corresponding to an edge portion in the predetermined section is obtained with an accuracy rate equal to or higher than a predetermined threshold value. When an approximate line corresponding to the edge portion in the predetermined section is obtained with an accuracy rate equal to or higher than the predetermined threshold value, the edge shape detector 23 sets the predetermined section as the first partial short section. When an approximate line corresponding to the edge portion in the predetermined section is not obtained with an accuracy rate equal to or higher than the predetermined threshold value, the edge shape detector 23 selects a different section from the predetermined section. Then, when an approximate line corresponding to an edge portion in the different section is obtained with an accuracy rate equal to or higher than the predetermined threshold value, the edge shape detector 23 sets the different section as the first partial short section.

Thus, the first partial short section can be easily acquired and the number of edge points sampled in the segment shape search processing can be relatively small. Therefore, a missing part of a document image can be properly detected with a relatively small amount of calculation.

Moreover, in the first embodiment, the missing part determiner 24 identifies a missing part area based on the detected edge shape and determines, based on the missing part area, whether or not a missing part of the document image has occurred. In doing so, the missing part determiner 24 identifies, as the missing part area, the area of one or a plurality of regions defined by an approximate line of an edge portion in a specified partial short section of the target image in a predetermined direction of the target image and the edge identified by the edge shape.

Thus, even if the edge shape is complicated, a missing part of a document image can be properly detected from the edge shape information with a relatively small amount of calculation.

Second Embodiment

Figure 8:
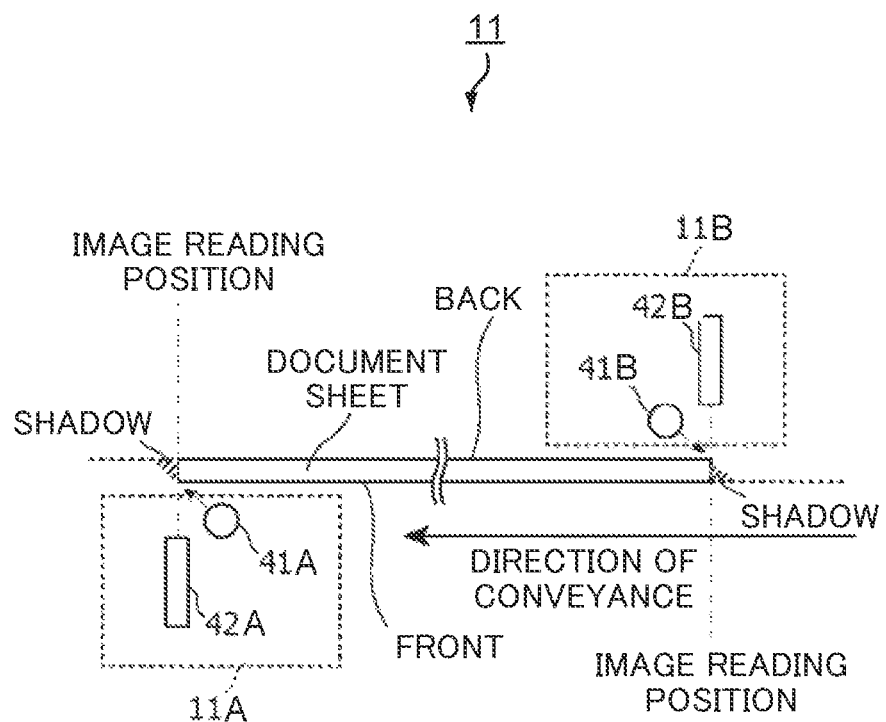
FIG. 8 is a view showing an image reading device in a second embodiment.

FIG. 8 is a view showing an image reading device 11 in a second embodiment.

In the second embodiment, the image reading device 11 includes: for example, as shown in FIG. 8, a first image reading device 11A that performs image reading of the front side of an original document; and a second image reading device 11B that performs image reading of the back side of the original document. The first image reading device 11A and the second image reading device 11B are disposed so that they can scan both sides of the original document during a single conveyance of the original document. Upon acceptance of a job request for a double-sided scan job, the controller 21 allows the image reading device 11 to perform a double-sided scan of the original document.

The first image reading device 11A includes a light source 41A and an optical system 42A that detects the reflection of light emitted to an image reading position by the light source 41A. The second image reading device 11B includes a light source 41B and an optical system 42B that detects the reflection of light emitted to an image reading position by the light source 41B. Each of the optical systems 42A and 42B includes an optical guide member, such as a lens, and an imaging sensor that detects the reflected light entering thereon through the optical guide member.

One of the first image reading device 11A and the second image reading device 11B (the first image reading device 11A in this embodiment) is provided with the light source 41A upstream of the image reading position in the direction of conveyance of the original document. The other of the first image reading device 11A and the second image reading device 11B (the second image reading device 11B in this embodiment) is provided with the light source 41B downstream of the image reading position in the direction of conveyance of the original document.

In the second embodiment, the target image acquirer 22 acquires a first target image from a read image of the front side of the original document read by the first image reading device 11A, like the target image described previously, and acquires a second target image from a read image of the back side of the original document read by the second image reading device 11B, like the target image described previously.

The edge shape detector 23 detects the respective edge shapes of both the leading edge and the trailing edge of a document image in a target image. Specifically, in the second embodiment, the edge shape detector 23 detects the edge shape of one of the leading edge and the trailing edge of a document image in a first target image (in this case, the edge shape of the leading edge easily throwing a shadow by the first image reading device 11A) and detects the edge shape of the other of the leading edge and the trailing edge of a document image in a second target image (in this case, the edge shape of the trailing edge easily throwing a shadow by the second image reading device 11B).

In the second embodiment, even when accepting a job request for a single-sided scan job, the controller 21 allows the image reading device 11 to perform image reading of both the front and back sides of an original document and allows the target image acquirer 22, the edge shape detector 23, and the missing part determiner 24 to check for a missing part of a document image as to both the leading edge and the trailing edge.

The other configurations and operations of the image reading apparatus according to the second embodiment are the same as those in the first embodiment and, therefore, further explanation of them will be omitted.

Generally, such an edge of an original document as described above is detected using a density difference in a read image between a shadow created at the edge of the original document during image reading and the original document. Therefore, when a light source that emits light during image reading is disposed upstream of the image reading position in the direction of conveyance of the original document, a shadow is easy to create at the leading edge of the original document, but a shadow is difficult to create at the trailing edge of the original document. On the other hand, when a light source that emits light during image reading is disposed downstream of the image reading position in the direction of conveyance of the original document, a shadow is easy to create at the trailing edge of the original document, but a shadow is difficult to create at the leading edge of the original document. Therefore, in checking for a missing part of a document image as to both the leading edge and the trailing edge, an edge where a shadow is difficult to create in a read image may not be properly detected.

Hence, in detecting a missing part of a document image (a missing part of a document image due to a fold or a lost part of an original document) using both the leading edge and the trailing edge of the original document, a missing part of the document image may not be properly detected.

To cope with the above problem, in the second embodiment, the image reading device 11 includes: a first image reading device 11A that performs image reading of the front side of an original document; and a second image reading device 11B that performs image reading of the back side of the original document. One of the first image reading device 11A and the second image reading device 11B includes a light source upstream of an image reading position in the direction of conveyance of the original document, while the other includes a light source downstream of an image reading position in the direction of conveyance of the original document. The edge shape detector 23 detects the edge shape of one of the leading edge and the trailing edge of a document image in a first target image showing the front side of the original document and detects the edge shape of the other of the leading edge and the trailing edge of the document image in a second target image showing the back side of the original document.

Thus, each of the leading edge and the trailing edge clearly appears in either one of the first target image and the second target image and is properly detectable, so that a missing part of a document image can be properly detected.

Various changes and modifications of the above embodiments will be apparent to those skilled in the art. Such changes and modifications may be made without departing from the spirit and scope of the subject-matter of the present disclosure and without undermining the intended advantages. In other words, such changes and modifications are intended to be included in CLAIMS.

INDUSTRIAL APPLICABILITY

The present disclosure is applicable to, for example, an image reading apparatus.

While the present disclosure has been described in detail with reference to the embodiments thereof, it would be apparent to those skilled in the art the various changes and modifications may be made therein within the scope defined by the appended claims.

What is claimed is:

1. An image reading apparatus comprising:
   an image reading device that performs image reading of an original document to generate a read image; and
   a control device that includes a processor and functions, through the processor operating in accordance with a control program, as:
      an edge shape detector that uses as a target image the read image or an image obtained by subjecting the read image to predetermined image processing and detects an edge shape of at least one of a leading edge and a trailing edge of a document image corresponding to the original document in the target image; and
      a missing part determiner that determines, based on the detected edge shape, whether or not a missing part of the document image has occurred,
   wherein the edge shape detector sets a partial short section of the target image in a predetermined direction of the target image, identifies an approximate line corresponding to an edge portion in the partial short section, and repeatedly executes segment shape search processing for deriving the approximate line as a segment shape to identify the edge shape,
   in the segment shape search processing, the edge shape detector sequentially detects edge points at predetermined intervals from at least one side of the partial short section toward an end of the target image in the predetermined direction, and
   when a distance from the approximate line to the associated edge point falls out of a predetermined range, the edge shape detector sets a next partial short section based on the edge point.

2. The image reading apparatus according to claim 1, wherein
   the edge shape detector identifies an approximate line corresponding to an edge in a non-end section where both lateral end portions of a predetermined width in the target image are excluded from the target image,
   when the approximate line corresponding to the edge in the non-end section is obtained with an accuracy rate equal to or higher than a predetermined threshold value, the edge shape detector keeps away from subjecting the edge in the non-end section to the segment shape search processing, when the approximate line corresponding to the edge in the non-end section is not obtained with an accuracy rate equal to or higher than the predetermined threshold value, the edge shape detector subjects the edge in the non-end section to the segment shape search processing, when, with regard to one of the leading edge and the trailing edge, the approximate line corresponding to the edge in the non-end section is not obtained with an accuracy rate equal to or higher than the predetermined threshold value, the missing part determiner determines, based on the edge shape detected by the segment shape search processing executed for the one of the leading edge and the trailing edge, whether or not a missing part of the document image has occurred, and the edge shape detector uses as the accuracy rate a rate of a number of edge points located within a predetermined range from the approximate line to a number of edge points sampled in the non-end section.

3. The image reading apparatus according to claim 2, wherein when, with regard to both the leading edge and the trailing edge, the approximate line corresponding to the edge in the non-end section is obtained with an accuracy rate equal to or higher than the predetermined threshold value and an angle between the approximate line of the leading edge and the approximate line of the trailing edge is less than a predetermined threshold value, the missing part determiner determines that no missing part of the document image has occurred, and when, with regard to both the leading edge and the trailing edge, the approximate line corresponding to the edge in the non-end section is obtained with an accuracy rate equal to or higher than the predetermined threshold value and the angle between the approximate line of the leading edge and the approximate line of the trailing edge is equal to or greater than the predetermined threshold value, the missing part determiner determines that a missing part of the document image has occurred.

4. The image reading apparatus according to claim 1, wherein when, in the segment shape search processing, detection of the edge points has finished without appearance of the edge point the distance of which from the approximate line falls out of the predetermined range, the edge shape detector ends setting of the next partial short section.

5. An image reading apparatus comprising:
an image reading device that performs image reading of an original document to generate a read image; and
a control device that includes a processor and functions, through the processor operating in accordance with a control program, as:
an edge shape detector that uses as a target image the read image or an image obtained by subjecting the read image to predetermined image processing and detects an edge shape of at least one of a leading edge and a trailing edge of a document image corresponding to the original document in the target image; and
a missing part determiner that determines, based on the detected edge shape, whether or not a missing part of the document image has occurred,
wherein the edge shape detector sets a partial short section of the target image in a predetermined direction of the target image and repeatedly executes segment shape search processing for deriving a segment shape associated with the partial short section to identify the edge shape, the edge shape detector selects as a candidate for the partial short section a predetermined section in a predetermined direction of the target image, when an approximate line corresponding to an edge portion in the predetermined section is obtained with an accuracy rate equal to or higher than a predetermined threshold value, the edge shape detector sets the predetermined section as the partial short section, when an approximate line corresponding to an edge portion in the predetermined section is not obtained with an accuracy rate equal to or higher than the predetermined threshold value, the edge shape detector selects a different section from the predetermined section as a candidate for the partial short section, when an approximate line corresponding to an edge portion in the different section is obtained with an accuracy rate equal to or higher than the predetermined threshold value, the edge shape detector sets the different section as the partial short section, and the edge shape detector uses as the accuracy rate a rate of a number of edge points located within a predetermined range from the approximate line to a number of edge points sampled in the predetermined section.

6. The image reading apparatus according to claim 5, wherein when failing to detect a section where an approximate line is obtained with an accuracy rate equal to or higher than the predetermined threshold value despite setting a candidate for the partial short section predetermined number of times, the edge shape detector avoids setting of the partial short section, and when the partial short section is not set, the missing part determiner determines that a missing part of the document image has occurred.

7. An image reading apparatus comprising:
an image reading device that performs image reading of an original document to generate a read image; and
a control device that includes a processor and functions, through the processor operating in accordance with a control program, as:
an edge shape detector that uses as a target image the read image or an image obtained by subjecting the read image to predetermined image processing and detects an edge shape of at least one of a leading edge and a trailing edge of a document image corresponding to the original document in the target image; and
a missing part determiner that determines, based on the detected edge shape, whether or not a missing part of the document image has occurred,
wherein the missing part determiner identifies as a missing part area an area of a region defined by an approximate line of an edge portion in a specified partial short section of the target image in a predetermined direction of the target image and the edge identified by the detected edge shape, when the missing part area is equal to or greater than a predetermined threshold value, the missing part determiner determines that a missing part of the document image has occurred, and when the missing part area is less than the predetermined threshold value, the missing part determiner determines that no missing part of the document image has occurred.

* * * * *